United States Patent Office 3,794,706
Patented Feb. 26, 1974

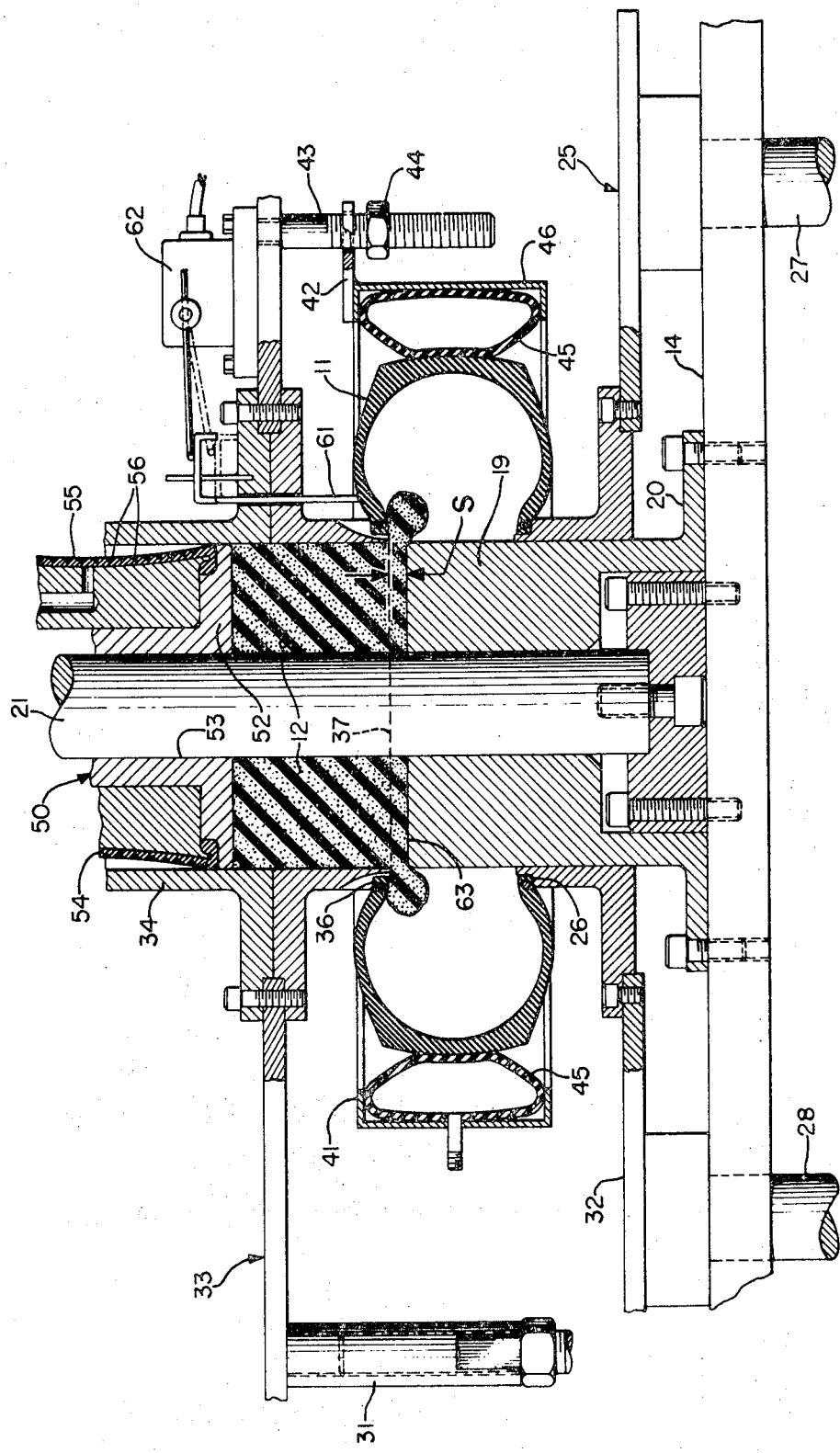

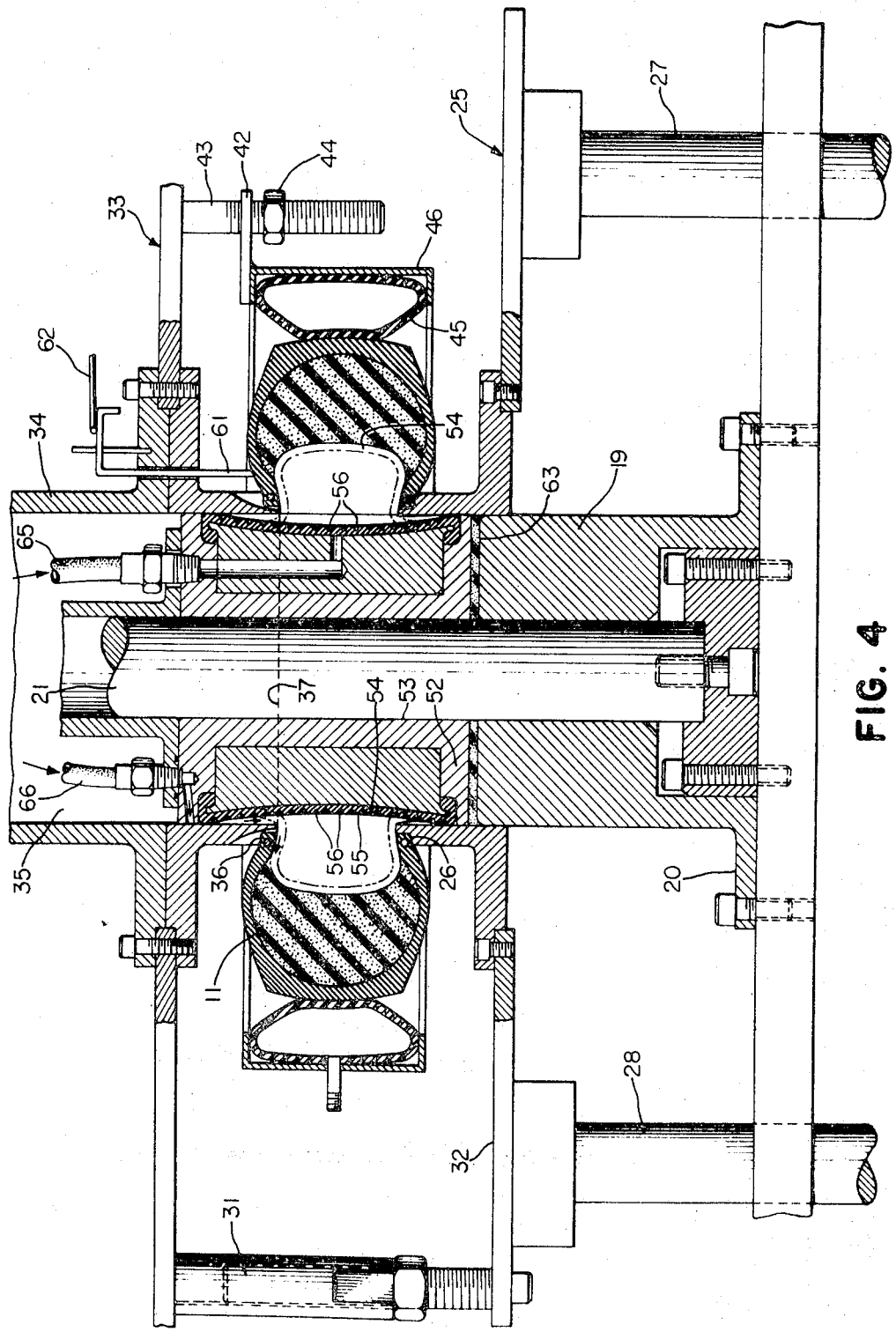

3,794,706
METHOD FOR BUILDING A FOAM-INFLATED TIRE
Christopher E. Christie, Akron, and Eugene Earl Martin, Hudson, Ohio, assignors to The Goodyear Tire & Rubber Company, Akron, Ohio
Original application Feb. 16, 1971, Ser. No. 115,264. Divided and this application Feb. 15, 1972, Ser. No. 226,412
Int. Cl. B29d 27/00; B29h 13/00
U.S. Cl. 264—45
4 Claims

ABSTRACT OF THE DISCLOSURE

An apparatus for at least partially filling a molded and vulcanized tire with foamable, elastomeric material. The apparatus has a pair of parallel, upper and lower bead seats on which a vulcanized tire is mounted. An inflatable ring is moved into position for annularly engaging and constricting the tire to maintain the beads of the tire in firm seated relation against the bead seats. An externally, accessible chamber is movable into communicating relation with the annular cavity of the tire mounted on the bead seats. Unfoamed, elastomeric material is then placed in the chamber and a ram is used to force the material from the chamber into the tire cavtiy. The ram carries a bladder which is centered in the space between the bead seats and inflated to compress the material within the tire cavity against the inner crown of the tire. The various components are then moved out of interfering relation with removal of the filled tire from the machine. The filled tire is then mounted on a wheel rim and heated to foam and cure the elastomeric material in the tire cavity.

BACKGROUND OF THE INVENTION

This is a division, of application Ser. No. 115,264 filed Feb. 16, 1971, now U.S. Pat. 3,676,028.

Many companies owning and operating off-the-road equipment such as trucks, bulldozers, and scrapers, have discovered the value of tires inflated with foamed, elastomeric material, since these tires are literally non-deflatable and almost indestructible from normal hazards such as rocks and nails. The time lost and cost of repairing and replacing tires is virtually eliminated or substantially reduced using foam-inflated tires and operators are able to keep their equipment in continuous operation.

Elastomeric material or resilient foam which may be used successfully for filling large earthmoving tires can be produced from natural rubber, GR-S, neoprene, acrylonitrile rubber, chlorosulfonated polyethylene, or other rubber-like materials, by the addition of a blowing agent which liberates nitrogen, such as dinitrosopentamethylenetetramine, sulfonyl hydrazides, or N,N'-bimethyl-N,N'-dinitrosoterephthalamide, as described in U.S. Pat. No. 3,022,810. Other suitable material is described in U.S. Pat. No. 3,381,735, especially Examples 1 and 3, mentioned in the patent.

Although there is an increasing demand for foam-inflated tires, the methods presently used for building such tires are tedious and costly, since the unfoamed elastomeric material is generally placed by hand within the cavity of a cured tire. Such methods are very time consuming and certainly not conducive to producing large numbers of these tires. This is especially true when manufacturing smaller tires used for industrial equipment such as fork-lift trucks. The invention is directed to solving this particular problem by providing a machine which uniformly and precisely fills a vulcanized or cured tire with a predetermined amount of foamable, elastomeric material to produce a non-deflatable tire with a certain desired tire pressure.

Briefly stated, the invention is in a method and apparatus for at least partially filling the cavity of a cured tire with foamable, elastomeric material. The method is accomplished by moving equal amounts of such material radially into the tire cavity simultaneously to at least partially fill the tire. This method is carried out by an apparatus which essentially comprises means for mounting a cured tire such that the cavity of the tire faces inwardly and is coaxial with the beads of the tire. A chamber for holding unfoamed, elastomeric material is disposed in communication with the cavity of the tire, and means are provided for forcing the material from the chamber into the tire cavity. Means are supplied for simultaneously deflecting equal amounts of the material radially into the tire cavity as the material is forced from the chamber. Means are also provided for compressing the unfoamed material within the tire cavity against the inner crown of the tire prior to removing the tire from the machine for mounting on a wheel rim and placing in a heated atmosphere to foam and cure the material within the tire.

Thus, the method for filling the cured tire body with foamable, elastomeric material has become almost completely automatic. Moreover, a single operator is needed for operating the machine, thereby reducing the time and expense in filling the tire with foamable material.

DESCRIPTION OF THE DRAWING

The following description of the invention will be better understood by having reference to the annexed drawing, wherein:

FIG. 3 is a detailed view showing a cured tire mounted in seated relation on the machine; and FIG. 4 is also a detailed view showing the bladder in position for being inflated into compressive engagement with the foamable, elastomeric material within the cavity of the tire.

DESCRIPTION OF THE INVENTION

Figure 1:
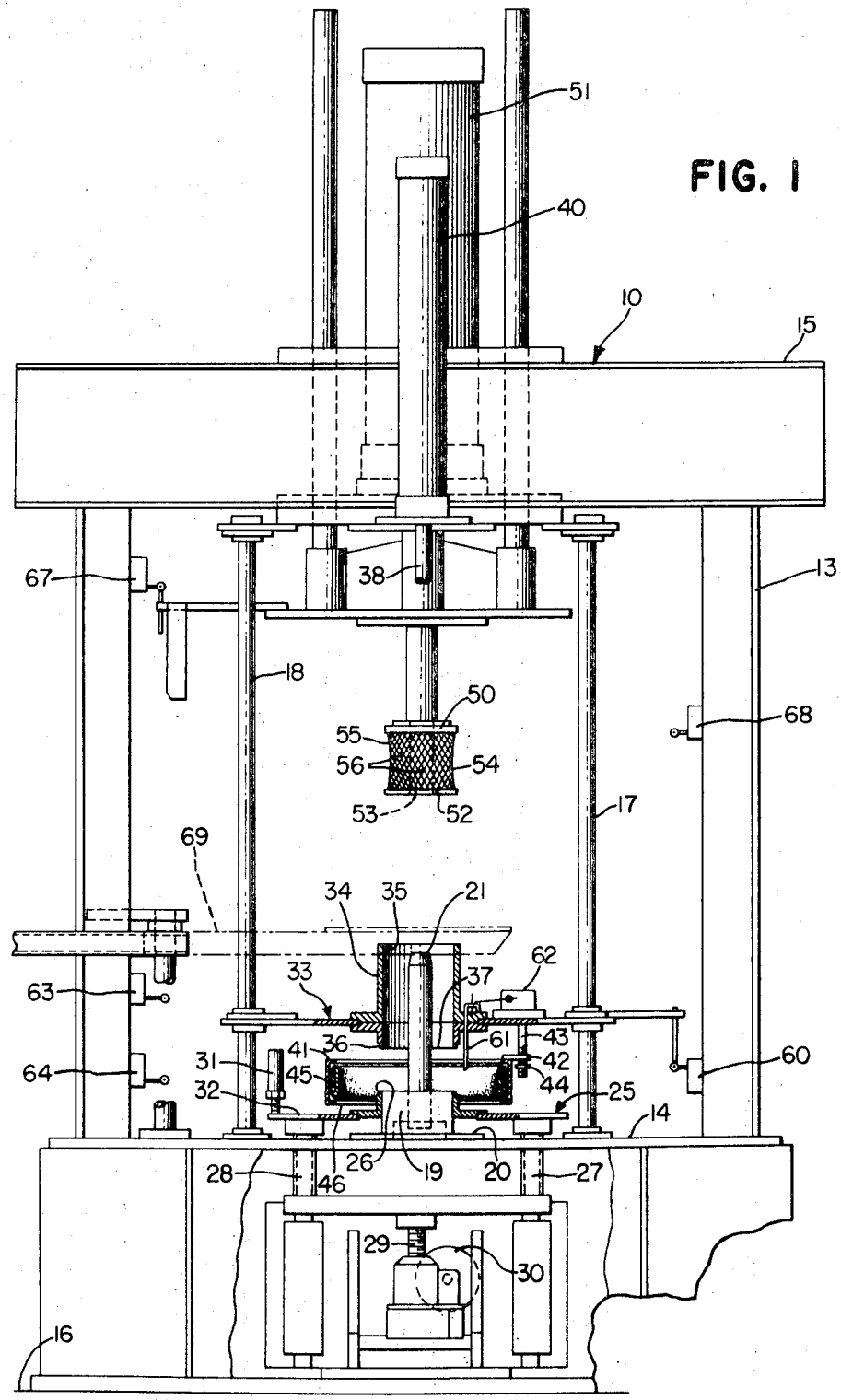
FIG. 1 is an end view of a machine made in accordance with the invention.
Figure 2:
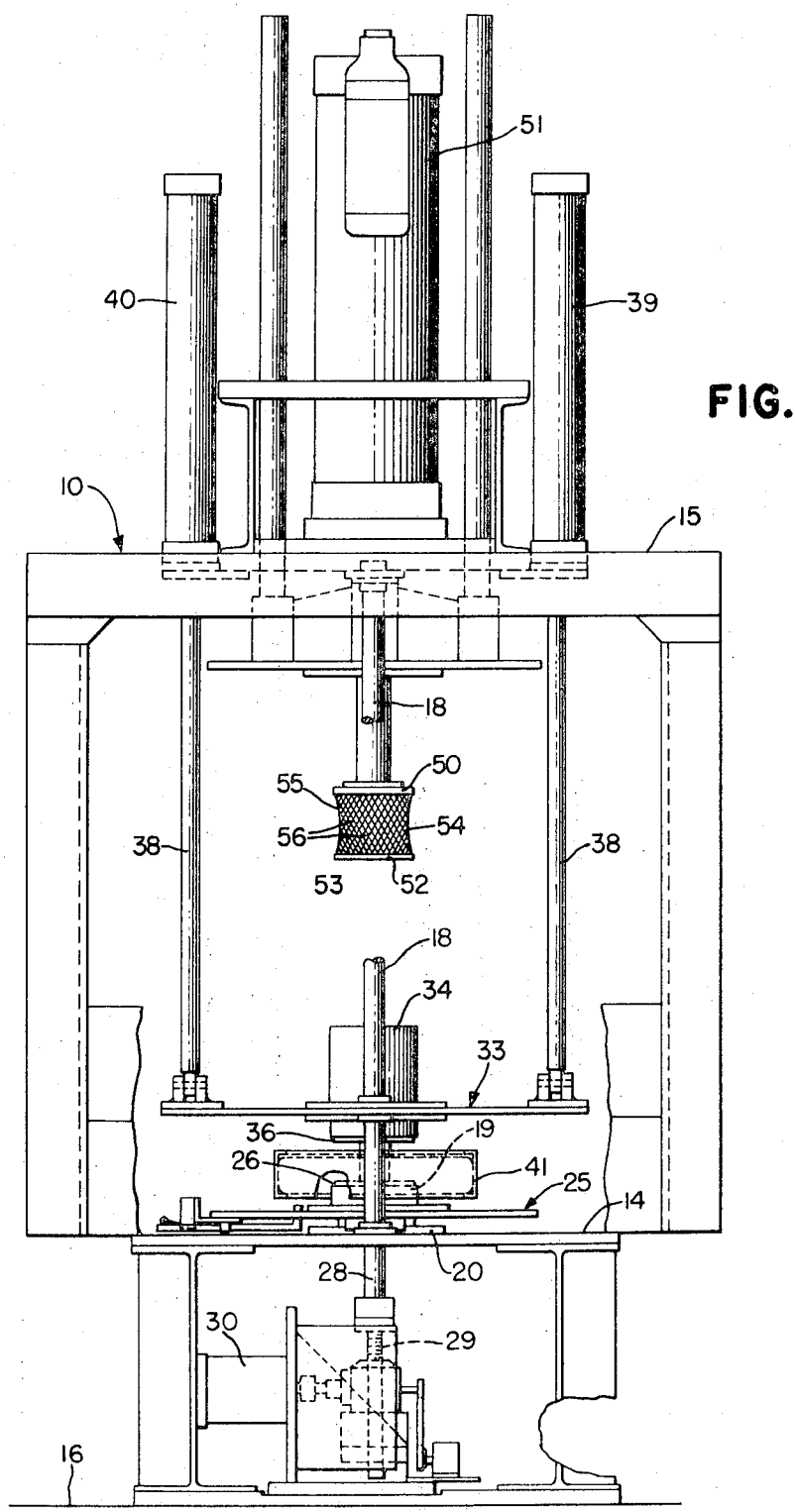
FIG. 2 is a side view of the machine.

Referring generally to the drawing, there is shown a machine or apparatus, generally indicated at 10 for at least partially filling a cured tire 11 with foamable, elastomeric material 12, as previously described. The machine 10 essentially comprises an upstanding frame 13, including a lower platform or support 14 and upper head 15 which are parallel and in horizontal planes when the machine 10 is mounted on a normally horizontal floor 16 of a factory building in which the machine is being used.

A pair of guide rods 17 and 18 are secured in parallel relation between the platform 14 and head 15. A cylindrical base 19 with an outstanding flange 20, is secured on the platform 14 midway between the guide rods 17 and 18. A spindle 21 is centrally disposed on the cylindrical base 19 and extends towards the head 15 in parallel relation with the guide rods 17 and 18.

A lower plate assembly 25, including an annular bead seat 26, is slidably mounted on the cylindrical base 19 for reciprocating movement along the longitudinal axis of the spindle 21. The lower plate assembly 25 is coupled by a plurality of support bars 27 and 28 to a rotatable drive screw 29 for raising and lowering the lower bead seat 26 relative to the platform 14. An electric motor 30 is operatively connected to the drive screw 29. An adjustable spacing bar 31 is threadably mounted on an outstanding flange 32 of the lower plate assembly 25.

An upper plate assembly 33 is slidably mounted on the guide rods 17 and 18 for movement toward and away from the cylindrical base 19 and lower plate assembly 25. The upper plate assembly 33 comprises a casing 34 with an inner chamber 35. An upper annular bead seat 36 is provided along a lower edge 37 of the casing 34. The lower and upper bead seats 26 and 36 are maintained in parallel planes normal to the longitudinal axis of the spindle 21, as they are moved relative to each other. The upper plate assembly 33 is coupled by similar piston rods 38 to a plurality of air or hydraulically operated cylinders 39 and 40 secured in upstanding relation on the head frame 15.

A constrictor ring 41 is freely suspended from the upper plate assembly 33 by any suitable means which allows limited relative movement between the ring 41 and supporting plate assembly 33. For example, a plurality of fingers 42 are arcuately spaced around the constrictor ring 41 for slidable engagement along similar pins 43, which are secured to the upper plate assembly 33 and extend downwardly towards the lower plate assembly 25. A stop 44 is provided for holding each of the fingers 42 on the pins 43. The constrictor ring 41 comprises an expansible ring 45 disposed within a cylindrical box 46. The expansible ring 45 is an inflatable rubber ring in this particular case. The casing 34 and constrictor ring 41 are coaxially aligned with the spindle 21. The chamber 35 takes on an annular configuration as the casing 34 is moved into surrounding relation around the spindle 21, when the upper plate assembly 33 is moved downward into position where the upper bead seat 36 engages an adjacent bead of the cured tire 11.

A ram 50 is axially aligned with the spindle 21 and operated by a cylinder 51 mounted on the head frame 15. The ram 50 comprises an annular head 52 having a centrally disposed bore 53 for receiving the spindle 21. An inflatable bladder 54, composed of any suitable rubber material, is carried by the ram 50 adjacent the head 52. The bladder 54 has an outer smooth surface 55 which is broken up by a number of serrations or grooves 56 which are molded into the rubber bladder 54.

OPERATION OF THE MACHINE

Assuming the upper plate assembly 33 and ram 50 are in their overhead rest positions in farthest spaced relation from the spindle 21 and cylindrical base 19, a cured tire 11 is horizontally positioned on the lower plate assembly 25 such that the lower annular bead of the tire 11 rests on the adjacent bead seat 26. The upper plate assembly 33 is actuated by a button switch and moves downward toward the lower plate assembly 25 until it engages the spacer bar 31. The upper plate assembly 33, as it moves downward, actuates a limit switch 60 for controlling operation of the ram 50. The constrictor ring 41 surrounds the tire 11 and the upper bead seat 36 is poised next to the upper bead of the tire 11, when the upper plate assembly 33 comes to a halt. The limit switch 60 also acts to operate a conventional mechanism for inflating the rubber ring 45 into annular compressive engagement with the adjacent tread of the tire 11. The inflating rubber ring 45 constricts the tire 11 and forces the tire beads into compressed seating relation against the adjacent bead seats 26 and 36. The constrictor ring 41, because of its mounting, is free to move with the tread toward the upper plate assembly 33 as the tire beads are forced apart against the bead seats 26 and 36.

The cured tire 11 (FIG. 3), as it is constricted, engages and moves a sensing finger 61 for actuating a limit switch 62 controlling operation of the ram 50. The limit switch 62 acts as a safety device for sensing the presence of a tire within the constrictor ring 41 and insuring proper seating of the tire beads before the ram 50 is actuated. The spindle 21 is centrally disposed in the chamber 35 and the upper bead seat 36 is in spaced relation from the adjacent upper flat surface 63 of the cylindrical base 19.

A predetermined amount of unfoamed, elastomeric material 12 is formed into an annulus and inserted into the annular chamber 35 surrounding the spindle 21. The ram 50 is actuated by a button switch and moves downward toward the spindle 21. The operator can stop the ram 50 at any point until it engages the first of a pair of limit switches 63 and 64 which are in predetermined spaced relation. The ram 50, after it trips the first limit switch 63, moves automatically until it engages the second limit switch 64 for stopping operation of the ram 50. The head 52 of the ram moves through the annular chamber 35 and forces the elastomeric material 12 radially outwardly from the chamber 35 into the cavity of the tire 11. The flat surface 63 of the cylindrical base 19 acts as a deflector for directing the elastomeric material 12 equally into the tire cavity in an ever-increasing annulus for uniformly at least partially filling the cavity of the tire 11. The spacing S between the upper bead seat 36 and cylindrical base 19 can be varied for different types of foamable material, since some materials are more easily forced into the tire cavity. The spacing S for material presently being used is about one-quarter of an inch. The foamable material is compressed and worked together as it passes through this narrow orifice, thereby preventing splitting and distortion of the annular insert being formed within the tire cavity. Because of the flat ram head 52 and surface 63, a thin annulus of elastomeric material remains on the cylindrical base 19. However, this amount of material is relatively small and, in succeeding operations, is retained to insure moving all of the elastomeric material into the tire cavity. A button switch is supplied for retracting and recycling the ram 50, if more material is required for insertion into the tire cavity. Sometimes this is necessary because the chamber 35 is not sufficiently sized to hold the volume of material required for filling the tire 11.

It is important to center the bladder 54 between the bead seats 26 and 36 (FIG. 4). Otherwise, the inflating bladder 54 moves unevenly into the tire cavity and correspondingly compresses the elastomeric material more to one side of the tire 11. A button switch is pressed to begin operation of the motor 30 which, in turn, rotates the drive screw 29 to move, in unison, the lower plate assembly 25 and engaged constrictor ring 41 and upper plate assembly 33 upwards toward the head frame 15 a distance sufficient to center the bladder 54 between the bead seats 26 and 36 and with the cavity of the tire 11. The cylinders, e.g. cylinders 39 and 40, controlling operation of the upper plate assembly 33 have meanwhile been deactuated to permit movement of the upper plate assembly 33 with the lower head assembly 25.

Any suitable means 65 for supplying air, under pressure, can be used for inflating and moving the bladder 54 outwardly into contacting compressive relation with the elastomeric material 12 disposed within the tire cavity. The bladder 54 can be collapsed and reinflated several times to insure uniform compaction of the elastomeric material within the tire cavity. As previously indicated, a number of serrations 56 are provided in the contacting surface 55 of the bladder 54. Any suitable means 66 for supplying air, under pressure, can be used for forcing air into the serrations 56 to help disengage the bladder 54 from the elastomeric material when the bladder is collapsed. Otherwise, the cohesive forces acting between the rubber bladder and elastomeric material might tend to pull the compacted elastomeric insert away from the inner crown of the tire. After the elastomeric insert is compacted within the tire cavity, the ram 50 automatically retracts and returns to its rest position where it engages the upper limit switch 67 for stopping travel of the ram 50. The upper plate assembly 33 also moves upwards back to its rest position where it engages the upper limit switch 68 for stopping its operation. The lower plates assembly, almost simultaneously, moves downward to its rest position adjacent the platform 14. The cured tire with the elastomeric insert, is retained within the inflated constrictor ring 41 as it returns to its rest position. A tire receiving basket or support 69 is rotated beneath the constrictor ring 41 for catching the tire 11, when the rubber ring 45 is collapsed out of compressive engagement with the tread of the tire. The tire catching support 69 is then rotated from beneath the upper plate assembly 33 to permit placing another tire on the machine 10.

The cured tire with the elastomeric insert is then mounted on a conventional wheel rim and placed in an atmosphere of hot gas or steam for foaming and curing the material to give a finished tire pressure corresponding to the amount of unfoamed material placed within the tire cavity.

Thus, there has been described a method and apparatus for inflating a tire with foamable, elastomeric material, and especially for placing the unfoamed, elastomeric material within the cavity of a cured tire.

While certain representative embodiments and details have been shown for the purpose of illustrating the invention, it will be apparent to those skilled in the art that various changes and modifications may be made therein without departing from the spirit or scope of the invention.

What is claimed is:

1. A method of producing a nondeflatable tire comprising the steps of:
    (a) sealing a previously molded and vulcanized tire in communication with a hollow chamber, such that the longitudinal axis of the chamber coincides with the center axis of the tire;
    (b) placing a predetermined amount of uncured, foamable elastomeric material in the chamber;
    (c) forcing the material from the chamber while simultaneously deflecting uniform portions thereof radially into the cavity of the tire, forming in the tire cavity an annulus of uniformly increasing size and diameter as the material is forced from the chamber;
    (d) compressing the annulus, formed within the tire cavity, against the inner crown of the tire;
    (e) demounting the tire from the chamber after the annulus is compressed against the inner crown of the tire;
    (f) mounting the tire at least partially filled with the material on a rim; and
    (g) heating the material within the tire cavity to a temperature and for a period of time sufficient to foam and cure the material within the tire.

2. The method of claim 1, wherein the amount of material placed in the chamber is in corresponding relation to a desired tire pressure produced by the material after it is foamed and cured within the tire cavity.

3. The method of claim 2, wherein the uncured, foamable elastomeric material is unvulcanized, foamable rubber material.

4. The method of claim 3, wherein the chamber has an annular configuration for receiving an annular ram used to force the material from the chamber into the cavity of the tire.

References Cited

UNITED STATES PATENTS

| | | | |
|---|---|---|---|
| 3,218,375 | 11/1965 | Hardwick | 264—48 X |
| 3,329,748 | 7/1967 | Hugger | 264—326 X |
| 3,396,773 | 8/1968 | Alderfer | 264—45 X |
| 3,527,852 | 9/1970 | Thill | 264—45 |
| 3,632,712 | 1/1972 | Miller | 264—326 X |
| 3,650,865 | 3/1972 | Hawkes et al. | 264—45 X |
| 3,605,848 | 9/1971 | Lombardi et al. | 260—2.5 AM X |

DONALD E. CZAJA, Primary Examiner

H. S. COCKERAM, Assistant Examiner

U.S. Cl. X.R.

156—113, 115; 264—48, 55, 326, 331, DIG 67